Figure 1B:
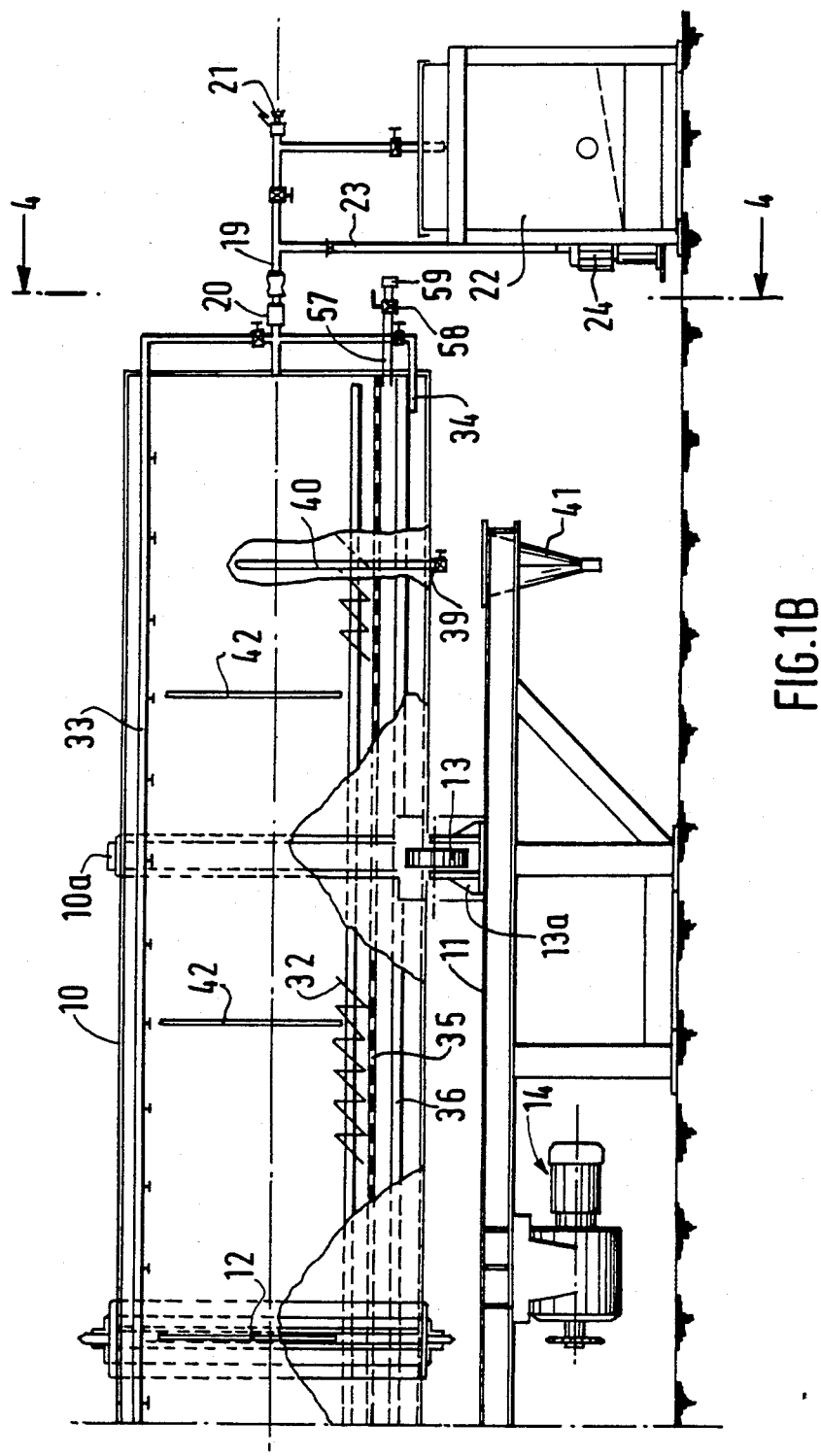

United States Patent [19]

Omente

[11] Patent Number: 4,821,455
[45] Date of Patent: Apr. 18, 1989

[54] INDUSTRIAL METHOD AND DEVICE FOR GERMINATING CEREALS AND/OR LEGUMINOUS PLANTS

[75] Inventor: Pedro Omente, Evin Malmaison, France

[73] Assignee: Societe Francaise D'Entretien et Montages Industriels Sofremi Zone Industrielle, Courcelles-Les-Lens, France

[21] Appl. No.: 80,959

[22] Filed: Aug. 3, 1987

[30] Foreign Application Priority Data

Aug. 13, 1986 [FR] France .................. 86 11707

[51] Int. Cl.⁴ .................. A01L 1/02; A01G 31/02
[52] U.S. Cl. .................. 47/61; 47/14
[58] Field of Search .................. 47/59, 60, 61, 62, 1.9, 47/14, 16; 29/DIG. 1; 192/657; 175/394; 34/109, 112, 140–142

[56] References Cited

U.S. PATENT DOCUMENTS

| | | | |
|---|---|---|---|
| 749,340 | 1/1904 | Timby | 34/142 |
| 2,928,211 | 3/1960 | Martin | 47/60 |
| 3,041,738 | 7/1962 | Ray | 34/112 |
| 4,385,468 | 5/1983 | Yoshiaki | 47/61 |
| 4,642,939 | 2/1987 | Suzuki | 47/61 |

Primary Examiner—Robert A. Hafer
Assistant Examiner—Danton D. DeMille
Attorney, Agent, or Firm—Bierman & Muserlian

[57] ABSTRACT

The present invention relates to an industrial device for germinating cereals, and/or leguminous plants, comprising an elongate cylindrical drum (10) mounted to be able to rotate about its axis, means (12,13,14) for driving this drum in rotation, means (31,32) for introducing the seeds to be treated into the drum and distributing them therein, means (33) for sprinkling seeds to be treated with an appropriate fluid over the entire length of the drum, and means (16,17) for blowing hot air into the drum.

6 Claims, 5 Drawing Sheets

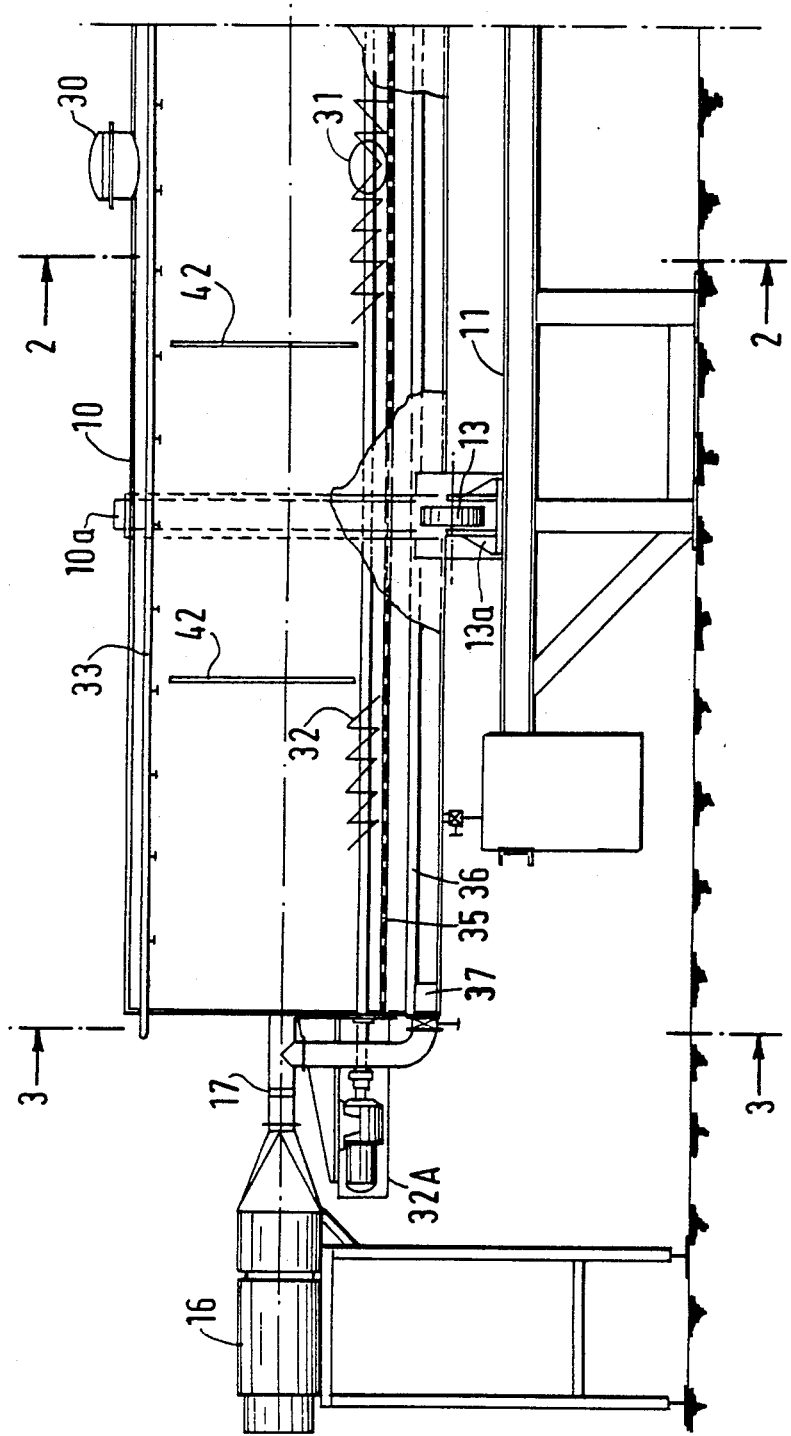

INDUSTRIAL METHOD AND DEVICE FOR GERMINATING CEREALS AND/OR LEGUMINOUS PLANTS

The present invention relates to the field of the production of animal feeds. More specifically, it relates to an industrial method and device permitting the biological germination of cereals and/or leguminous plants.

Conventionally, the natural germination of cereals, for example of barley in a malt house, is brought about by keeping them in large open-air tank which may or may not be sprayed. These methods possess the disadvantage of requiring a long period in order to bring about germination. Moreover, the products obtained are not generally in a homogeneous state.

An object of the present invention is to provide a method and a device making it possible to obtain germinated cereals and/or leguminous plants automatically and on an industrial scale.

Another object of the present invention is to provide such a method associated with such a device of relatively simple structure and relatively low cost, capable of being operated at the sites where the cereals and/or leguminous plants are produced and/or where the animal feeds obtained are consumed, in other words in the cereal and/or leguminous plant growing regions and/or livestock-rearing regions.

In order to achieve the said objects, the present invention proposes an industrial method for the germination of cereals and/or leguminous plants comprising the following steps:

(a) loading the seeds which are to be germinated into an elongated cylindrical drum and distributing them therein, (b) washing the seeds by sprinkling with a liquid or immersion in a liquid poured into the drum, and draining off washing liquid.

(c) at least one hot-air ventilation phase, subsequent to the washing, (d) at least one phase of sprinkling the seeds by spraying a hot liquid into the drum, subsequent to the washing, and draining off the excess liquid, and (e) at least one phase in which the drum is driven to rotate about its axis, subsequent to the washing.

In a preferred alternative embodiment, this method comprises, subsequent to the washing, a repetitive cycle comprising a ventilation phase, a sprinkling phase and two rotation phases, one of which takes place at least partly between the ventilation phase and the sprinkling phase, and the other between one of these two phases of the cycle in question and the other of these two phases, but of the preceding or subsequent cycle.

The four phases of this cycle may take place as a sequence of successive phases, but in another alternative embodiment of the method it is likewise possible for at least one ventilation phase and at least one rotation phase and/or at least one sprinkling phase and at least one rotation phase to overlap at least partly in time. In this latter case, it will be advantageous if the end of a period of overlap between two phases corresponds to the end of the ventilation or sprinkling phase, before the end of the corresponding rotation phase. The germinated seeds can be used in the relatively moist state in which they are present at the end of the alternative embodiments of the method proposed above, but when it is desired to use relatively dry germinated seeds, intended to be ground and mixed with other animal feeds, the method according to the invention advantageously comprises, in its various alternative embodiments, a final stage of drying the germinated seeds in the drum. Moreover, it is possible and advantageous, if necessary, to complete the method by a step in which a liquid for disinfecting the drum and/or the seeds is injected into the drum, this step preferably taking place before the washing. Finally, the method may likewise include a step in which at least one preservative product, such as lactic bacteria, is added, preferably in liquid form, to the batch of seeds contained in the drum.

Moreover, the present invention proposes an industrial device for germinating seeds, comprising: an elongate cylindrical drum, mounted to be capable of rotating about its axis, means for driving this drum in rotation, means for introducing into the drum the seeds to be germinated and distributing them therein, means for sprinkling the seeds to be treated with an appropriate fluid and over the entire length of the drum, and means for blowing air into the drum.

According to one aspect of the device according to the present invention, the means for introducing and distributing the seeds comprise a trap provided in the wall of the drum, facing an endless-screw assembly which possesses inverted threads in the two opposite directions from the zone close to the said trap. According to another aspect of this device, the sprinkling means establish a link towards a direct water supply and towards a reservoir containing water and possible additives, this reservoir being brought to a selected temperature greater than ambient temperature.

In a simply structured embodiment, the rotational drive means for the drum comprise, on the one hand, at least one toothed wheel fixed to the periphery of the drum and interacting with a chain driven by a motor drive assembly and, on the other hand, rollers providing support and mounted to rotate loosely about axles fixed to the pedestal of the drum. Moreover, to break up any agglomerations or clumps of seeds which might form during the rotations of the cylindrical drum, the device further possesses breaker blades mounted within the drum.

In order to be able to obtain a relatively dry batch of germinated seeds, the device further comprises, in addition to the ventilation means, drying means which are located in a reserved space defined within the drum by at least one removable grating. Finally, to facilitate the implementation of a phase in which a disinfectant fluid is injected into the drum, when such a phase is desired, the device further possesses specific means for injecting this disinfectant fluid into the drum.

Figure 2:
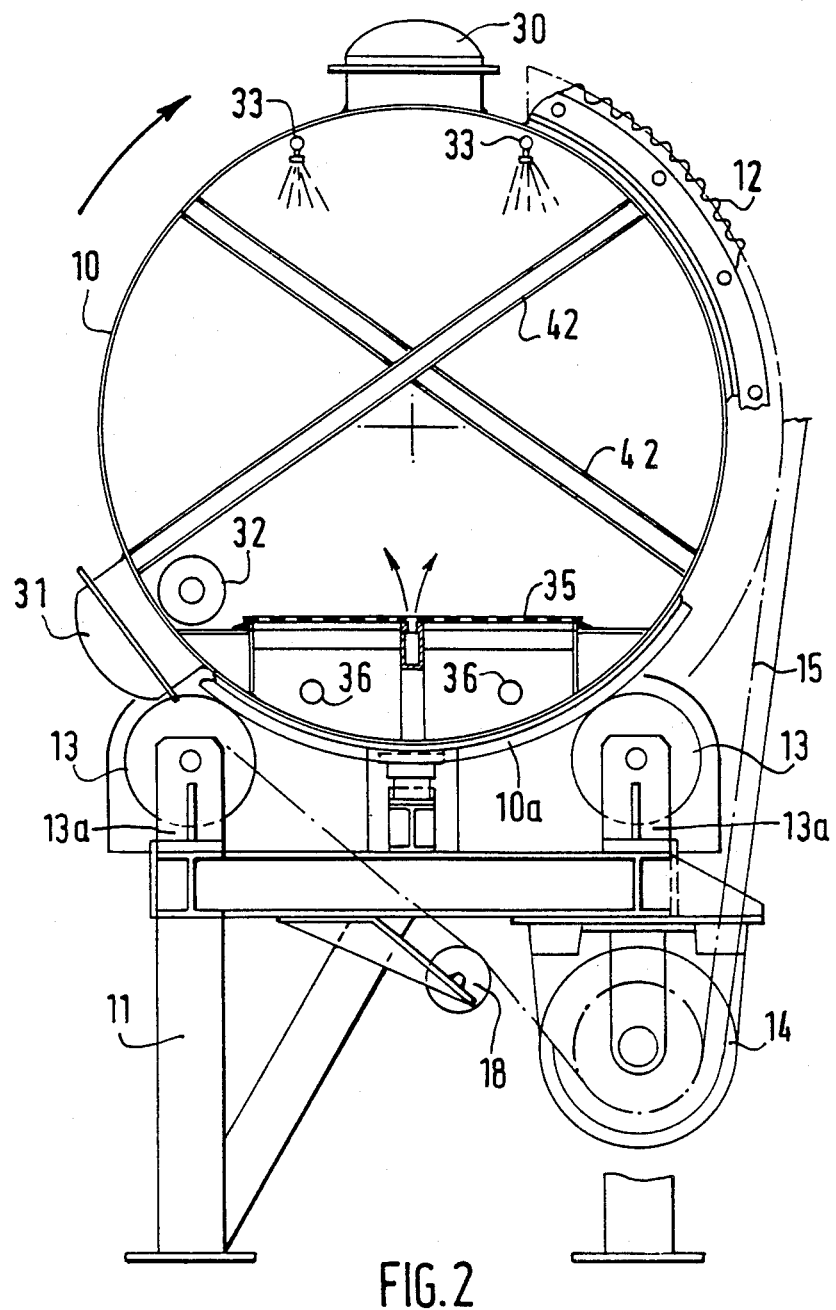
Figure 3:
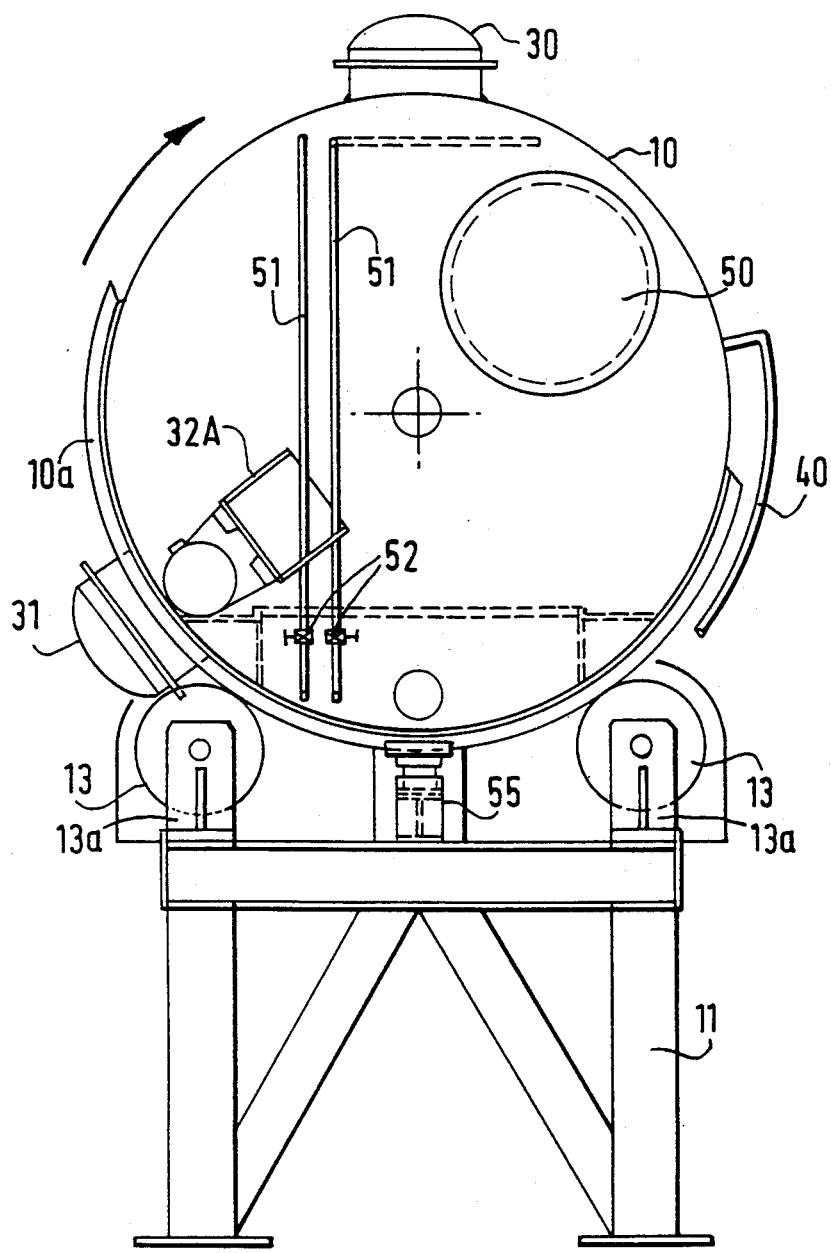
Figure 4:
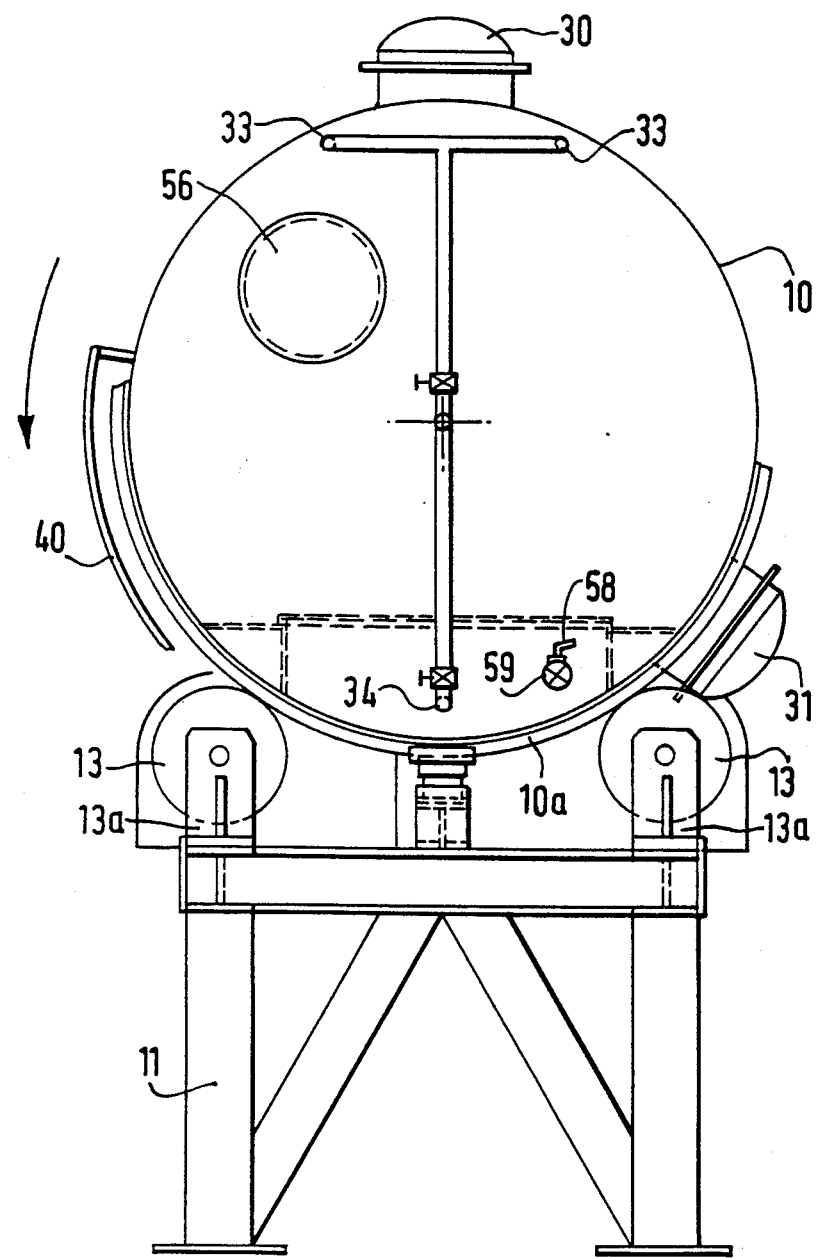

These objects, features and advantages of the invention will be described in greater detail in the description of specific embodiments which follows and which is given in conjunction with the attached figures wherein:

FIGS. 1A and 1B, assembled in the manner shown in FIG. 1C, show a sectional lateral view of the device according to the present invention; and FIGS. 2, 3 and 4 show end and sectional views along the planes 2—2 and 3—3 and 4—4 in FIG. 1.

FIGS. 1A and 1B, taken together, in the manner shown in FIG. 1C, show diagrammatically a side view of a cereal germinating apparatus according to the present invention. This apparatus comprises a cylindrical drum (10), the length of which is substantial relative to its section, for example, in a practical embodiment, for an apparatus making it possible to treat batches of 12 tonnes of cereals, a length of 12 meters as compared with a diameter of the order of 2 meters. This drum is mounted on a pedestal 11 in a manner such as to be able to rotate on itself about its longitudinal axis. This rotation of the drum 10 can be obtained by means of a peripheral rack or toothed wheel 12, fixed to the drum 10 and driven by a geared motor drive assembly 14 having an electric brake, which is mounted on a support fixed to the pedestal 11, and via a drive chain 15 (see FIG. 2) engaging with the toothed wheel 12 and with a pinion driven by the output shaft of the assembly 14. Moreover, the drum 10 possesses on its exterior lateral surface two peripheral roller tracks 10a, whereby it rests in facing positions, spaced axially along the drum 10 and symmetrically on either side of the vertical diametrical plane of the drum 10, on running and guiding rollers 13 each mounted to rotate loosely about a fixed axle, parallel to that of the drum 10, and on a fork 13a for attachment to the pedestal 11 (see also FIGS. 2 to 4), in order that the drum 10 may rotate with low friction.

Means external to the drum are also provided:

to blow hot air into the said drum by means of a ventilation assembly with heating batteries 16, essentially comprising a fan and electrical heating resistors, supported by an independent frame, and connected along the axis of the drum 10 by means of a revolving joint 17, to feed various fluids into the said drum by means of a fluid supply pipe 19, connected along the axis of the drum 10 by means of a revolving joint 20, various valves making it possible to feed into the pipe 19 either, directly, external water arriving at a solenoid valve joint 21 connected on a pipe, or a specific fluid located in a reservoir with heating resistors 22, mounted on an independent frame, and by means of a second pipe 23 and a solenoid pump 24, to supply electricity to heating resistors arranged within the drum 10 and to a drive motor for endless screws, which will be described below.

The drum 10 further comprises, in its lateral wall having a substantially horizontal generating line, a ventilation trap 30 and a loading and unloading or drainage trap 31. The trap 31 is located in the vicinity of the central region of the drum, and the latter further contains an endless screw 32 or a pair of Archimedean screws extending over the entire length of the drum 10, in an eccentric position within the latter, and possessing inverted threads from the region of this screw 32 corresponding to the position of the loading and unloading trap 31 (see FIGS. 1A and 2). This screw 32 is driven by a geared motor drive assembly with a reversible motor 32A fixed against the exterior face of an axial end wall of the drum 10, for example that through which the hot air is blown axially into the drum 10 via the revolving joint 17.

Thus, by appropriate selection of the direction of rotation of this screw 32, during loading, the seed poured into the drum 10 through the trap 31 is spread over the entire length of the drum 10 and, during unloading via the trap 31, this germinated seed is collected towards the unloading zone. The loading and distribution will take place with a trap 31 and a screw 32 in a high position, after an appropriate rotation of the drum 10, whereas the rearrangement towards the trap, and the unloading, will take place with the trap 31 and the screw 32 in the low position, again after an appropriate rotation of the drum 10.

The fluid feed pipe 19 is connected, on the one hand, to one or more sprinkling or spraying booms 33, in the upper position in FIGS. 1A and 1B, and, on the other hand, to a diametrically opposed liquid introduction pipe 34, in the lower position in these figures. A lower zone (in FIGS. 1A and 1B) of the drum 10 is equipped with a retractable or removable grating 35 making it possible to reserve an internal part of the drum into which the seed does not penetrate during treatment. In the zone set aside by this grating 35 there are arranged, in particular, one or more drying lines 36, for example a system of electrical heating resistors or a system providing hot air under pressure, fed by a power unit (not shown). Provision is also made for introducing into this reserved zone, if appropriate, via a line 37, pulsed air originating from the ventilation assembly 16. The reserved zone likewise permits better drying and an accumulation of fluid, the excess of which is drained through an overflow aperture connected to a strainer 40 external to the drum 10, the free end of which is fitted with a drainage valve 39, in the low portion of the drum 10 in the position shown in the figures. If necessary, a funnel 41 will be provided in the pedestal 11, the wide aperture of which funnel, pointing upwards, is intended to receive the fluid drained through the valve 39, and in particular the flushing or sprinkling water, as detailed below. The aperture of the funnel 41 will be sufficiently large to collect the drained fluid even when a certain degree of rotation is imparted to the drum 10 relative to the position shown in the figures.

The reference numerals 42 indicate the metal blades or struts which are arranged in the drum 10, substantially in transverse planes, and serve to break up agglomerations or clumps which might form therein. This breaking-up takes place during the driven rotation of the drum 10.

The axial end wall of the drum 10, on the side of the reservoir or container 22, is pierced by a connection 57 for injecting into the drum 10 a fluid for disinfecting the drum itself and/or the seeds which it contains, this connection 57 being fitted with a tap having an open-/close valve 58 and, at its free end, a quick-action joint 59 to a supply line for disinfectant liquid or gas.

FIGS. 2, 3 and 4 are views along the lines 2—2, 3—3 and 4—4 in FIG. 1, that is to say a median section, a view from the left and a view from the right, respectively, of the device in FIGS. 1A and 1B. These views will not be described in detail, being intended solely to offer the person skilled in the art a better understanding of various aspects of the invention which would not be immediately apparent from analysis of FIGS. 1A and 1B. They likewise show additional details which do not appear in FIG. 1. In these views, the same reference numerals are used to indicate the same elements as in FIG. 1.

In FIG. 2, more specifically, it will be noted that in the embodiment shown two sprinkling booms 33 are provided. This figure also offers a better view of the breaker blades 42, mounted in pairs of blades which intersect in transverse planes of the drum 10, and of the relative arrangement of the endless screw 32 which is eccentric and faces the loading and unloading trap 31. Similarly, the grating 35 which makes it possible to set aside an internal part of the drum 10 in which two drying lines 36 are provided is more clearly shown.

The FIG. 2 also shows the drive rack 12 associated with the drive motor 14 by a chain 15 subject to the action of roller tensioning means 18 which are supported by the pedestal 11, shown in the lower part of FIG. 2. The support rollers 13 for the drum 10 are likewise shown in FIG. 2.

In FIG. 3, which is a view from the left-hand end of the device in FIG. 1, the elements already represented in FIGS. 1 and 2 can again be seen, together with an inspection trap 50 and extensions 51, fitted with valves 52, of the sprinkling booms 33, which serve to drain the fluids from these booms. In the central part of the figure, between the drum 10 and the platform 11, a system 55 can be seen which has already appeared in FIG. 2 and serves to lock the drum in a given position.

FIG. 4 is a view from the right-hand end of the device in FIGS. 1A and 1B. In addition to the elements already described, this figure shows that a ventilation trap 56 is provided in the corresponding end wall of the drum 10, and that the water overflow drainage strainer 40 is a curved strainer extending substantially around one-quarter of the perimeter of the drum 10.

In order to procure the biological germination of cereal seeds, the device described and shown is operated as follows.

In a first stage, the drum 10 is charged with a cereal such as wheat, barley, oats, maize, etc., via the trap 31, while the screw 32 located opposite the trap is driven to rotate. Naturally, during this stage, the trap 31 is brought into a raised position by an appropriate rotation of the drum 10. The trap 31 can then be brought back into the position shown in the figures, and the screw 32 actuated again in order further to improve the distribution of the seed in the drum. Providing for several rotations of the drum will likewise help to distribute the seed better.

In a second stage, during which the drum 10 is immobilized with respect to rotation, in the position shown in the figures, the seeds are then washed by immersion in a washing liquid such as water, introduced via the line 34, and/or by sprinkling by means of the booms 33, and the washing liquid is simultaneously evacuated through the drainage valve 39 in the lower part of the drum, as soon as the overflow level has been reached. This washing, which is intended to remove any impurities and toxic products present in the drum and/or the seeds, can be carried out by connecting the inlet line 19 into the drum 10 directly to the water supply nozzle 21. The third stage is broken down into several sub-stages of spraying hot water onto the washed batch of cereal contained in the drum 10, from the fluid, such as hot water, contained in the reservoir 22, by means of the pump 24, the pipe 23, the revolving joint 20 and the booms 33, then of internal hot-air ventilation, by means of the ventilation assembly 16 and the revolving joint 17, together, if appropriate, with the line 37, and finally of successive rotations of the drum 10 between and/or at least partly during these various stages, to permit the seeds to be mixed and satisfactorily aerated. In a first alternative embodiment of the method, the third stage consists of a regular repetition of a cycle of phases comprising a phase of sprinkling with water at a temperature of about 30°, a phase of rotating the drum 10 on itself through at least one revolution, a phase of hot-air ventilation, and a further phase of rotating the drum 10 on itself for at least one revolution. This cycle may consist of a sequence of four consecutive phases, in other words a sequence such that a first phase of rotation begins only after the end of a sprinkling phase, a hot-air ventilation phase begins only after or at the end of the first rotation phase, a further rotation phase begins only after or at the end of the ventilation phase, and the sprinkling phase of the next cycle begins only after or at the end of the second rotation phase of the preceding cycle. Following the washing step, it is likewise possible for the cycle of the germination step as such to begin with a ventilation phase, followed by a rotation phase, then a sprinkling phase and finally a further rotation phase. Provision can be made for six complete cycles of sprinkling, rotation, ventilation and rotation, to take place within twelve hours.

In another alternative embodiment of the method, the third step consists of a succession of cycles in the course of each of which at least one hot-air ventilation phase in the drum and at least one rotation phase of the drum overlap at least partly in time, and/or at least one phase of sprinkling the seeds in the drum and at least one phase of rotation of the drum overlap at least partly in time. In this case, it is preferable for the ventilation phase and/or the sprinkling phase to be concluded before the end of the corresponding rotation phase, independently from the fact that the ventilation and/or sprinkling phase have begun before, simultaneously with or after the start of the corresponding rotation phase.

In all the alternative embodiments, whether the sprinkling and ventilation phases are more or less simultaneous with the rotation phases or whether the various phases are consecutive, the third step, or germination step as such, of the method may be considered as internal hot-air ventilation interrupted by the spraying of hot water with or without preservative, and successive and sequential rotations of the drum to promote the mixing and aeration of the product.

The draining of the water introduced for the washing and sprinkling operations takes place permanently during these phases, since the drainage valve 39 remains open throughout these phases.

Under normal conditions germination is achieved at the end of three or four days, depending on the cereal concerned, its state of ripeness and the external climatic conditions. Once germination has taken place, and depending on the desired quality of the finished product, the product thus obtained can be kept in its "moist" state, and extracted from the drum 10 after the drum has been turned in a manner such as to bring the trap 31 and the screw 32 into the low position, turning the screw 32 in the direction which moves the product towards the central part of the drum, facing the trap 31, in order for example to feed adult cattle with this "moist" product, whereas if it is desired to obtain a "medium-dry" product, which can be used for example for feeding calves, after being ground and mixed with other animal feeds, then in a final stage before extraction from the drum 10 a more or less substantial drying operation will be carried out, depending on the desired product, using the drying lines 36 and, if appropriate, the line 37 fed by the ventilation assembly 16. This last step may, if appropriate, be preceded by a step comprising treatment with a preservative product, for example lactic bacteria. These bacteria can be placed in the reservoir 22 and spread through the seed in liquid form during the final sprinklings with hot water. This step of adding lactic bacteria in liquid form in order to promote the preservation of the product can, of course, likewise be carried out before the extraction of a "moist" product, as the final step in a method which includes no drying after germination. Moreover, the method may include a supplementary step, wherein, before the start of the germination cycle as such of the batch in the drum 10, a gaseous or liquid fluid for disinfecting the drum 10 only is injected into the said drum through the connection 57 and the valve 58, in which case the disinfectant is injected before the loading of the drum 10, or for disinfecting the drum and the seeds, in which case the disinfectant is injected after the drum is loaded.

In a test machine produced in this manner, which makes it possible to establish artificially conditions of humidity and heat which promote an acceleration of the natural phenomenon of germination, it proved possible to treat 12 tonnes of cereals which, after germination, gave 20 tonnes of product.

The product obtained can be used as a feed or feed supplement for livestock (dairy cattle, pigs, calves, sheep, etc...). It can likewise serve as a silage preservative, for example for silages based on beetroot or maize.

The various steps of the method, as described above, can form the subject of programming to actuate the various valves for introducing fluid or blowing in hot air, and the switches for bringing into operation the motors of the assemblies 14 and 32A, and also the electrical heating resistors of the drying lines, of the ventilation assembly and of the reservoir for hot water and lactic bacteria. The apparatus can then function in a totally automatic manner, being controlled by a microprocessor programmer. The present invention is not limited to the embodiments which have explicitly been described, but is capable of various alternative embodiments. For example, various intermediate steps such as specific treatment steps during the initial wash can be added. Similarly, the practical embodiment of the treatment device can likewise undergo various modifications provided that these do not depart from the spirit and scope of the claims which follow.

I claim:

1. Industrial device for germinating at least one member of the group consisting of cereals and leguminous plants comprising:
    an elongate cylindrical drum (10) capable of rotating about its axis,
    means (12,15,14) for rotating said drum,
    means (31,32) for introducing the seeds to be germinated into the drum (10) and distributing them therein,
    means (33) for sprinkling the seeds to be treated with an appropriate fluid and over the entire length of the drum (10)
    means (16,17) for blowing hot air into the drum (10), and
    means for draining the fluid introduced into the drum, the said means for introducing and distributing the seeds comprises a trap (31) arranged in the wall of the drum (10) facing a screw assembly comprising right and left hand helical portions proceeding from a central point located at the trap to evenly distribute the seeds over the length of the drum.

2. Industrial device for germinating seeds according to claim 1, wherein the sprinkling means (33) are connected to a direct water supply (21) and to a reservoir (22) containing water and possible additives at a selected temperature greater than ambient temperature.

3. Industrial device for germinating seeds according to claim 1, wherein the rotational drive means comprises a toothed wheel (12) fixed to the periphery of the cylindrical drum (10) and interacting with a chain (15) driven by a motor drive assembly (14) and rollers (13) providing support and mounted to rotate loosely about axles fixed to the pedestal (11) of the drum (10).

4. Industrial device for germinating seeds according to claim 1, wherein it further comprises breaker blades (42) mounted in the drum (10) for breaking up, during the rotations of the cylindrical drum, any agglomerations of seeds which might form.

5. Industrial device for germinating seeds according to claim 1, characterized in that it further comprises drying means (36), in addition to ventilation means, these drying means being arranged in a reserved space defined within the drum (10) by at least one removable grating (35).

6. Industrial device for germinating seeds according to claim 1, wherein it further comprises means (57, 58,59) for injecting a disinfectant fluid into the drum.

* * * * *